United States Patent
Zhang (10) Patent No.: US 8,659,625 B2
(45) Date of Patent: Feb. 25, 2014

(54) MOBILE TERMINAL AND METHOD FOR ADJUSTING MENU BAR SOFTKEY DISPLAY DYNAMICALLY

(75) Inventor: Xue Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,569

(22) PCT Filed: Mar. 23, 2010

(86) PCT No.: PCT/CN2010/071215
§ 371 (c)(1),
(2), (4) Date: Jun. 14, 2012

(87) PCT Pub. No.: WO2010/148674
PCT Pub. Date: Dec. 29, 2010

(65) Prior Publication Data
US 2012/0242706 A1  Sep. 27, 2012

(30) Foreign Application Priority Data
Dec. 18, 2009 (CN) .......................... 2009 1 0261643

(51) Int. Cl.
G09G 5/00 (2006.01)
G06F 9/44 (2006.01)
G06F 3/0481 (2013.01)
G06T 3/40 (2006.01)
G05B 19/4093 (2006.01)

(52) U.S. Cl.
CPC ............. *G06F 8/38* (2013.01); *G06F 3/0481* (2013.01); *G06T 3/40* (2013.01); *G05B 19/40935* (2013.01)
USPC ........... 345/661; 345/662; 345/663; 345/664; 345/665; 345/666; 345/667; 345/169; 345/173; 715/786; 715/810; 715/825; 715/866

(58) Field of Classification Search
CPC ........... G06F 8/38; G06F 3/0481; G06T 3/40; G05B 19/40935
USPC .......... 715/786, 810, 825, 866; 345/169, 173, 345/661–667
See application file for complete search history.

(56) References Cited

U.S. PATENT DOCUMENTS 5,381,461 A * 1/1995 Baals et al. .................. 379/457
6,469,719 B1 * 10/2002 Kino et al. ................... 715/810

(Continued)

FOREIGN PATENT DOCUMENTS

CN    1552031 A    12/2004
EP    0996053 A2    4/2000

(Continued)

OTHER PUBLICATIONS

English-language abstract of Chinese Patent No. CN 1552031A, European Patent Office, Dec. 1, 2004.
English-language abstract of PCT Patent Application Publication No. WO 2006/034958, World Intellectual Property Organization, Apr. 6, 2006.

*Primary Examiner* — Jin-Cheng Wang
(74) *Attorney, Agent, or Firm* — DASCENZO Intellectual Property Law, P.C.

(57) ABSTRACT

A method and terminal for adjusting menu bar softkey display dynamically are provided by the present invention. The method includes the following steps: obtaining the total display length of the menu bar and the respective corresponding character string length value and the location information of all the softkeys on the menu bar; setting the softkey of which the character string length value is non-zero on the menu bar as the non-zero softkey; assigning the display location and display length of each non-zero softkey according to the number of the non-zero softkeys and location information of each non-zero softkey; and displaying each non-zero softkey according to the assigned display location and display length. The method and terminal of the present invention overcomes the current defect that currently the fixed value is adopted to display the softkey of the bottom bar.

22 Claims, 3 Drawing Sheets

A. Obtain a total display length of menu bar and respective corresponding character string length value and location information of all the softkeys on the menu bar B. Assign display location and display length of each non-zero softkey according to the number of the non-zero softkeys whose character string length values are not zero on the menu bar and location information of the non-zero softkeys, and display each non-zero softkey according to the assigned display location and display length

(56) References Cited

U.S. PATENT DOCUMENTS

| | | | |
|---|---|---|---|
| 2003/0157970 A1* | 8/2003 | Kraft et al. | 455/566 |
| 2004/0141011 A1* | 7/2004 | Smethers et al. | 345/810 |
| 2004/0142720 A1* | 7/2004 | Smethers | 455/550.1 |
| 2006/0123357 A1* | 6/2006 | Okamura | 715/786 |
| 2006/0174215 A1* | 8/2006 | Yan et al. | 715/825 |
| 2006/0174217 A1* | 8/2006 | Yan et al. | 715/866 |

FOREIGN PATENT DOCUMENTS

| | | |
|---|---|---|
| EP | 1004957 A1 | 5/2000 |
| WO | WO 2006/034958 | 4/2006 |

* cited by examiner

MOBILE TERMINAL AND METHOD FOR ADJUSTING MENU BAR SOFTKEY DISPLAY DYNAMICALLY

TECHNICAL FIELD

The present invention relates to the field of mobile communication technology, and in particular, to a mobile terminal and a method for adjusting menu bar softkey display dynamically on a user interface of the mobile terminal.

BACKGROUND OF THE RELATED ART

With the development of the mobile communication technology, the mobile terminal has already been popularized in the whole world day by day, and its user image interface (UI interface) brings the most direct experience visually to the user and may become the first reason for a user to select a product, so the reasonable interface design is a very important factor for the mobile terminal.

Figure 1:
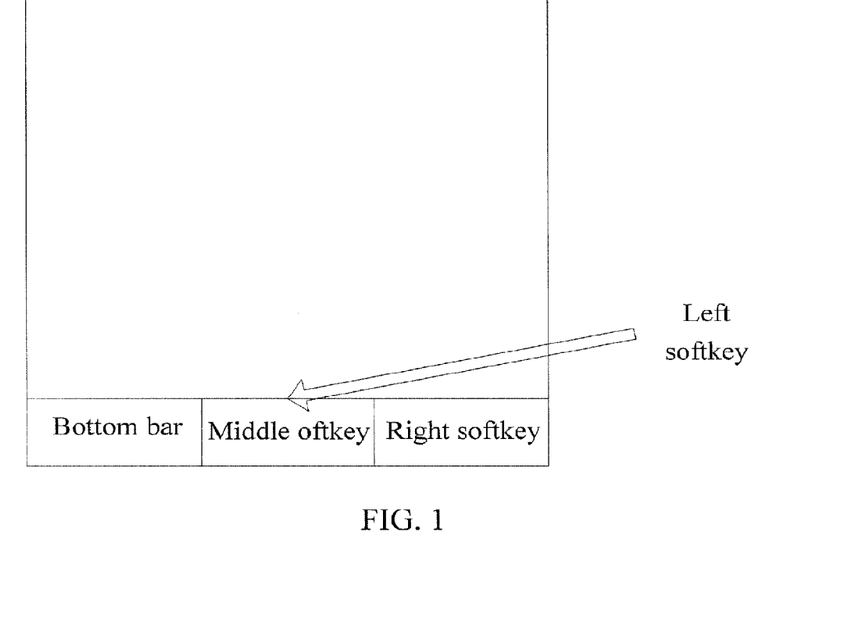
FIG. 1 is a diagram of a bottom bar softkey display in a current mobile phone interface.

The current mobile phone or other mobile terminal usually has various menu bars on its user interface, one or more softkeys are configured on the menu bar, and the corresponding character string content is displayed on the softkey. As shown in FIG. 1, in general cases a bottom bar area is demarcated on the screen bottom as the menu bar for displaying the menu button to prompt the user to perform a series of operations. The bottom bar is generally divided into three keys: left, middle and right according to actual circumstances, and the length of each key is usually set as a fixed value, for example, the bottom bar is equally divided according to the length of the whole bottom.

However, since the functions of the mobile phone are more and more abundant at present, the menu information which needs to be displayed by the bottom bar is also more and more abundant. Moreover, the mobile phone products may be sold to other countries, and the languages of a plurality of countries and regions are different from one another. For the same function key, the case that the length of a word exceeds the display range may present, which leads to the fact that the fixed length assigned on the bottom bar is often unable to display completely, and the word is hard to rewrite in short in some cases, and even if it is managed to rewrite the word in short with difficulty, it can bring the bad experience to the user.

When a certain softkey character string is unable to be displayed completely, other softkey character strings may be very short or no content is displayed at all. In the assignment principle of the fixed equally dividing length, the spare space in this case cannot be used for displaying the softkey which is unable to display the character string completely. This causes the occurrence of the contradiction situation that the display spaces of some softkeys are insufficient while the display spaces of other softkeys are over abundant.

So, this needs one technical scheme which can assign the display location and the length of a plurality of softkeys similar to the bottom bar dynamically, to meet the requirement that the softkey of the menu bar can display the corresponding character string content normally under the complicated situation, such as, multi-language environment, etc.

CONTENT OF THE INVENTION

The technical problem that the present invention is required to solve is to provide a mobile terminal and a method for adjusting menu bar softkey display dynamically on the user interface of that mobile terminal, which solves the problem of not displaying correctly caused by the conflict between the length difference of the character string of the softkey on the current menu bar and the fixed display length.

In order to solve the above-mentioned problem, the present invention provides a method for adjusting menu softkey display dynamically, comprising the following steps of:

obtaining a total display length of a menu bar and respective corresponding character string length value and location information of all softkeys on the menu bar; and assigning display location and display length of each non-zero softkey according to the number of the non-zero softkeys whose character string length values are not zero on the menu bar and the location information of the non-zero softkeys, and displaying each non-zero softkey according to the assigned display location and display length wherein:

a sum of the display length of each non-zero softkey is less than or equal to the total display length of the menu bar; if the character string length value corresponding to one non-zero softkey exceeds the display length assigned for that non-zero softkey, intercepting or abbreviating the character string corresponding to the non-zero softkey.

The step of displaying each non-zero softkey according to the assigned display location and display length may comprise:

if the character string length values corresponding to all the non-zero softkeys are less than or equal to a length mean value received after the total display length of the menu bar is averaged according to the number of the non-zero softkeys, then assigning the display location according to the location information of each non-zero softkey, regarding the length mean value as the display length, and displaying each non-zero softkey.

The step of displaying each non-zero softkey according to the assigned display location and display length comprises:

if the character string length value corresponding to any one non-zero softkey is greater than a length mean value received after the total display length of the menu bar is averaged according to the number of the non-zero softkeys and the number of the non-zero softkeys is 1, then:

assigning the display location according to the location information of that non-zero softkey, assigning a length value of which the display length is less than or equal to ¾ of the total display length of the menu bar, and displaying that non-zero softkey.

The step of displaying each non-zero softkey according to the assigned display location and display length comprises:

if the character string length value corresponding to any one non-zero softkey is greater than a length mean value received after the total display length of the menu bar is averaged according to the number of the non-zero softkeys and the number of the non-zero softkeys is 2, then:

assigning the display location according to the location information of each non-zero softkey, assigning a length value of which the display length is less than or equal to ⅖ of the total display length of the menu bar for each non-zero softkey, and displaying each non-zero softkey.

The step of displaying each non-zero softkey according to the assigned display location and display length comprises:

if the character string length value corresponding to any one non-zero softkey is greater than a length mean value received after the total display length of the menu bar is averaged according to the number of the non-zero softkeys and the number of the non-zero softkeys is 3, then:

obtaining a sum disSum of the character string lengths of three non-zero softkeys, if the difference of the total display length of the menu bar disManu and the disSum is less than or equal to a first threshold value, then obtaining a mean value of surplus display space disAve=(disSum−disManu)/2; and assigning the softkey display location according to the location information of the three the non-zero softkeys, setting an initial coordinate of a first softkey as 0, the initial coordinate of a second softkey being the sum of the length value of the first softkey and the mean value disAve, the initial coordinate of a third softkey being the difference of the total display length of the menu bar disManu and the length value of the third softkey, and displaying the first, second and third softkeys according to the assigned display location and the display coordinate dynamically.

The step of displaying each non-zero softkey according to the assigned display location and display length comprises:

if the character string length value corresponding to any one non-zero softkey is greater than a length mean value received after the total display length of the menu bar is averaged according to the number of the non-zero softkeys and the number of the non-zero softkeys is 3, then:

obtaining a sum disSum of the character string lengths of three non-zero softkeys, if the difference of the total display length of the menu bar disManu and the disSum is greater than a first threshold value, then obtaining a length difference of the character string of the first and third softkeys of which the location information locates at two ends respectively; if the length difference is greater than a set second threshold value, then:

setting an initial coordinate of the first softkey as 0, setting the initial coordinate of the third softkey as a difference of the total display length of the menu bar disManu minus the character string length of the first softkey and the second threshold value, and the second softkey being displayed in the middle in a surplus display space.

The step of displaying each non-zero softkey according to the assigned display location and display length comprises:

if the character string length value corresponding to any one non-zero softkey is greater than a length mean value received after the total display length of the menu bar is averaged according to the number of the non-zero softkeys and the number of the non-zero softkeys is 3, then:

obtaining a sum disSum of the character string lengths of three non-zero softkeys, if a difference of the total display length of the menu bar disManu and the disSum is greater than a first threshold value, then obtaining a length difference of the character string of the first and third softkeys of which the location information locates at two ends respectively; if the length difference is less than or equal to a set second threshold value, then:

setting the length values of the first, second and third softkeys to be less than or equal to ⅓ length of the total display length of the menu bar disManu respectively, assigning the display location according to the location information of the first, second and third softkeys, and performing intercept or abbreviation on the character string which goes beyond ⅓ length of the total display length of the menu bar disManu.

The menu bar locates at a bottom bar, or a top bar, or a left side bar, or a right side bar on a user interface of a mobile terminal.

The location information comprises: left location, middle location and right location.

The present invention also provides a mobile terminal, comprising a control module for adjusting menu bar softkey display dynamically, wherein, the control module comprises a parameter obtaining unit, a display configuration unit and a display unit, wherein, the parameter obtaining unit is configured to obtain a total display length of a menu bar and respective corresponding character string length value and location information of all softkeys on the menu bar;

the display configuration unit is configured to assign display location and display length for each non-zero softkey according to the number of the non-zero softkeys whose character string length values are not zero on the menu bar and location information of the non-zero softkeys;

the display unit is configured to display each non-zero softkey according to the assigned display location and display length, wherein:

a sum of the display length of each non-zero softkey is less than or equal to the total display length of the menu bar; if the character string length value corresponding to a single non-zero softkey exceeds the display length assigned for that non-zero softkey, intercept or abbreviation is performed on the character string corresponding to the single non-zero softkey.

The menu bar locates at a bottom bar, or a top bar, or a left side bar, or a right side bar on a user interface of a mobile terminal.

The location information comprises: left location, middle location and right location.

The mobile terminal and the method for adjusting menu softkey display dynamically of the present invention can dynamically assign the display location and length of the softkeys of the bottom bar, and it is made to be able to meet the requirement of the softkey on the menu bar to the display content of the character string under various situations, such as the bottom bar, etc. Especially it is suitable for the dynamic display of the left, middle and right softkeys on the bottom bar in the user interface of the mobile communication terminals, such as the mobile phone, etc., which overcomes the defect that currently the fixed value is adopted to display the softkey of the bottom bar.

PREFERRED EMBODIMENTS OF THE PRESENT INVENTION

In order to make the object, technical scheme and advantage of the present invention more clear, the present invention is described in detail with reference to the accompanying drawings and embodiments hereinafter. It should be understood that the embodiment described here is only used to explain the present invention, while not used to limit the present invention.

The present invention, aiming at the problem that the softkey with long character string is unable to be displayed completely and the softkey with short character string wastes the display space caused by the fixed softkey length value when the soft key is displayed on the menu bar on the user interface of the current mobile terminal, proposes a technical scheme for adjusting softkey display dynamically, which can display the softkey dynamically according to the actual conditions.

Figure 2:
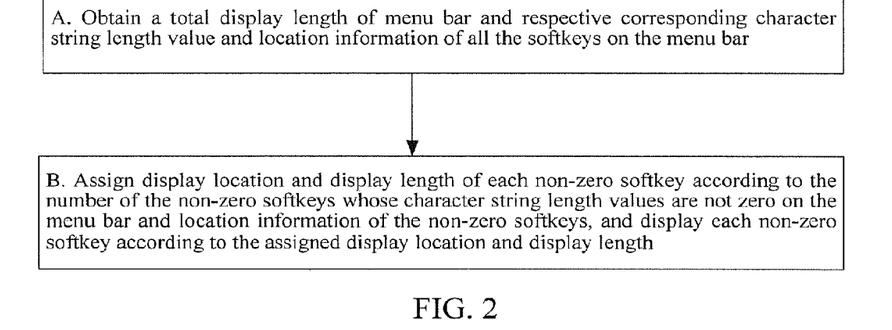
FIG. 2 is a flow chart of a method for adjusting menu bar softkey display dynamically of the present invention.

As shown in FIG. 2, the method for adjusting menu bar softkey display dynamically of the present invention includes the following steps:

A. obtaining a total display length of a menu bar and respective corresponding character string length value and location information of all the softkeys on the menu bar; and B. assigning display location and display length of each non-zero softkey according to the number of the non-zero softkeys whose character string length values are not zero on the menu and location information of the non-zero softkeys, and displaying the non-zero softkeys according to the assigned display location and display length, wherein:

a sum of the display length of each non-zero softkey is less than or equal to the total display length of the menu bar; if the character string length corresponding to a non-zero softkey exceeds the display length assigned for that softkey, intercept or abbreviation processing is performed.

The location information can be a left location, a middle location or a right location, or is the location array information representing the successive location sequence when the number of softkeys exceeds three, such as, the location number.

The menu bar can be located at a bottom bar, or a top bar, or a left side bar, or a right side bar on the user interface.

The dynamic display method of the present invention is described in detail by taking the bottom bar as an example and by the implementation mode that three softkeys, left, middle and right, are set in the bottom bar hereinafter. For other formats of the menu bar, it can refer to the implementation mode of the bottom bar to process.

The method for performing a dynamic display on the bottom bar with three softkeys, left, middle and right includes the following steps:

101. reading the character strings inputted respectively from the left, middle and right softkeys in the bottom bar, and measuring the length of each character string, with an item without the character string being identified as null;

102. determining whether to enter the dynamic calculation flow according to the character string length of each softkey and the information on whether each item is null; and adopting the normal mode of trisection to make a display if dynamic calculation is not required;

103. entering the dynamic algorithm flow, making a determination according to the length information of each item of character string, and entering different dynamic calculation processing flows;

104. performing dynamic calculation processing on the display location and the occupied display length of the left, middle and right softkeys display according to different dynamic algorithms, and implementing display of the bottom bar softkey on the interface according to the display position and display length.

Figure 3:
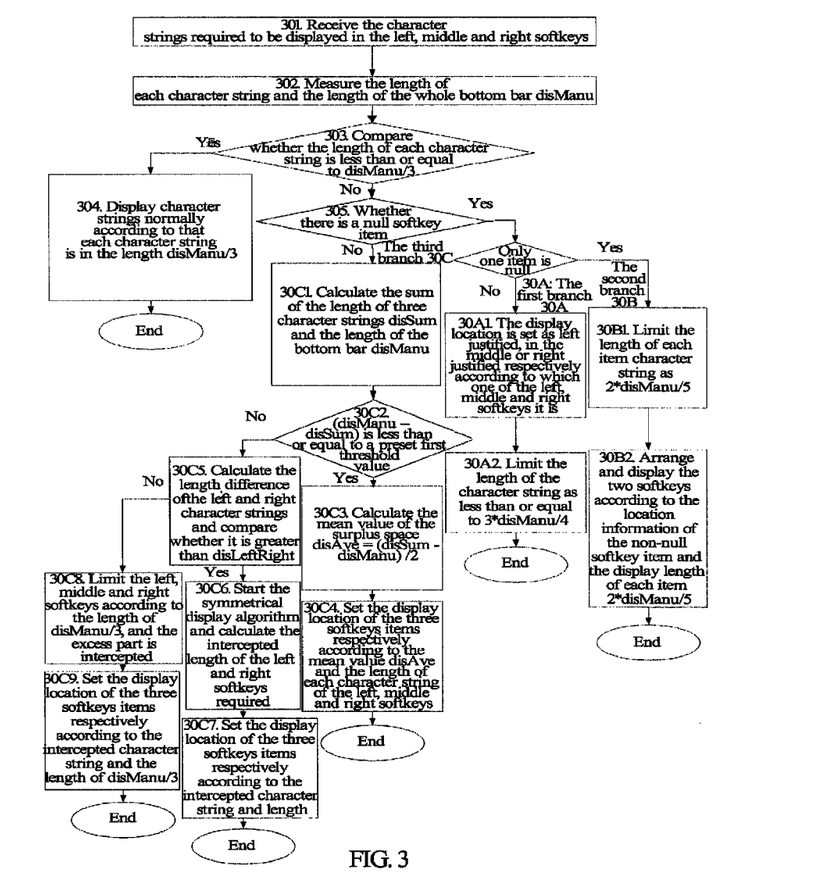
FIG. 3 is a flow chart of dynamic display taking bottom bar as an embodiment according to an embodiment of the present invention.

FIG. 3 shows the specific execution flow of the dynamic display of each softkey on the bottom bar and the dynamic algorithm branches:

301. receive the character string information of the three softkeys, left, middle and right, required to be displayed; if one certain softkey has no corresponding character string information, then identify the character string of that softkey as null;

302. measure the length values respectively occupied by the character strings corresponding to the three softkeys, left, middle and right: disleft, dismid and disright, and identify the attribute of the softkey of which the character string is null as 1; and obtain the length information of the whole bottom bar disManu at the same time;

303. trisect the length information of the whole bottom bar disManu to obtain the mean value of the length disManu/3, and compare the length value occupied by the character string corresponding to each softkey with the mean value of the length disManu/3;

304. if the length value occupied by the character string corresponding to each softkey is less than or equal to disManu/3, then show that it can be displayed normally, and do not start the dynamic algorithm, and the flow ends;

305. if the length value occupied by the character string corresponding to each softkey is greater than disManu/3, then enter the dynamic algorithm flow; firstly check whether the three softkeys, left, middle and right, are non-null, and it can be divided into the following three algorithm branches according to the check result:

The first branch 30A, only one softkey is non-null:

30A1. in this case, according to which one of the left, middle and right softkeys is the non-null softkey, perform display as left justified, in the middle or right justified respectively in the whole bottom bar length according to the position information;

30A2. however, in order to reflect the exactness of the location corresponding to the softkey without letting the user produce the "malposition" feeling, the maximum display length of each item is less than or equal to the ¾ of the whole bottom bar length; if it goes beyond, then the method of intercepting or shortening the character string is adopted.

The second branch 30B, two softkeys are non-null:

30B1. the length of each item of character string is limited as 2*disManu/5;

30B2. according to the location information of the non-null softkey item and the display length of each item 2*disManu/5, the two softkeys are displayed in array, wherein:

if the left and right softkeys are non-null, then divide the bottom bar length from the middle, and display the two softkeys on the left and right sides respectively by adopting the left justified and right justified modes; in order to avoid the case that the two items are too close to distinguish, the display length of each item does not exceed ⅘ of the length after the bottom bar is divided from the middle; if it goes beyond, then adopt the method of intercepting or shortening the character string similarly;

if the left and middle softkeys are non-null, then divide the former ⅘ of the length of the whole bottom bar from the middle, and then display the two softkeys on the left and right sides respectively by adopting the left justified and right justified modes; if it goes beyond, then adopt the method of intercepting or shortening the character string;

if the middle and right softkeys are non-null, then divide the latter ⅘ of the length of the whole bottom bar from the middle, and then display the two softkeys on the left and right sides respectively by adopting the left justified and right justified modes; if it goes beyond, then adopt the method of intercepting or shortening the character string.

The third branch 30C, all three softkeys are non-null:

30C1. calculate the sum of the length of three character strings disSum at first;

30C2. judge whether the difference obtained by the length of the whole bottom bar disManu minus the disSum is less than or equal to one preset first threshold value;

30C3. if yes, calculate the mean value of the surplus space disAve=(disSum−disManu)/2;

30C4. then set the initial coordinate of the left softkey as 0, the initial coordinate of the middle softkey as (disleft+dis- Ave), and the initial coordinate of the right softkey as (disManu−disright) according to the mean value, thus realizing the dynamic display of the three softkeys according to the actual length;

30C5. if it judges in 30C2 that the difference obtained by the length of the whole bottom bar disManu minus the disSum is greater than one preset first threshold value, then start the algorithm flow of displaying the left and right softkeys symmetrically, calculate the length difference of the left and right character strings, and set one acceptable maximum value of the difference of the two items disLeftRight and compare the maximum value with the length difference of the left and right character strings;

30C6. if the length difference of the left and right character strings is greater than the maximum value disLeftRight, it shows that the display of the left and right softkeys is asymmetric, the situation of malposition is easily to be generated at the display location, and it needs to intercept the longer character string in the left and right softkeys respectively; if the shorter one is the character string of the left softkey at this moment, then the intercepted length is a result calculated by a formula: (disleft+disLeft);

30C7. then according to (disleft+disLeft), set the initial coordinate of the left softkey as 0, the initial coordinate of the right softkey as (disManu−(disleft+disLeft)), while the middle softkey is displayed in the middle in the surplus space after the left and right softkeys are displayed; if there is a situation of incomplete display, the intercepting processing is adopted as well, thus realizing the dynamic and symmetrical display of the three softkeys items according to the actual length;

30C8. if the length difference of the left and right character strings is less than or equal to the maximum value disLeftRight, then it shows that the length difference of the left and right softkeys is in the set reasonable range of the symmetrical display, and the left, middle and right softkeys are set respectively according to the length limitation of disManu/3 after the excess part is intercepted and processed;

30C9. then it is displayed normally according to the trisection location. Till now, the algorithm flow of dynamically calculating the whole bottom bar ends.

Figure 4:
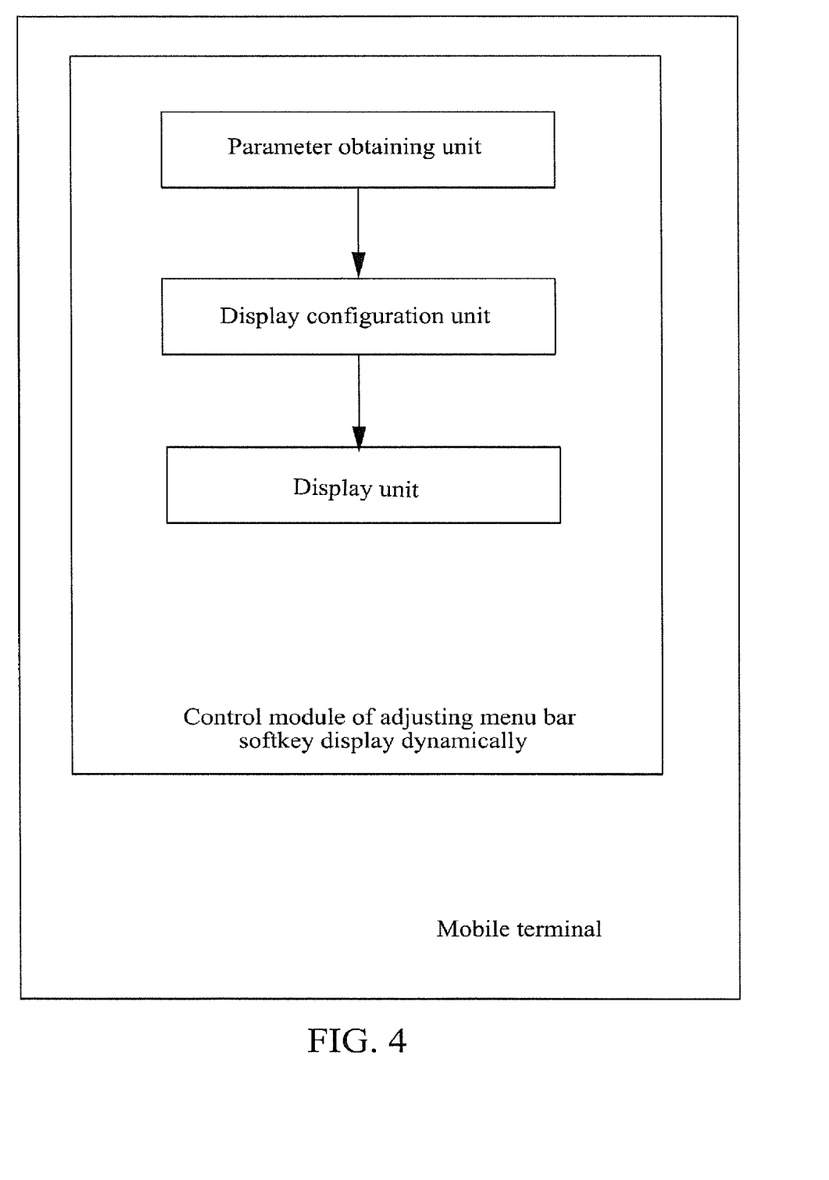
FIG. 4 is a function module diagram of a control module for adjusting menu bar softkey display dynamically on a mobile terminal of the present invention.

The present invention further provides a mobile terminal applying the dynamic display method based on the above-mentioned method for adjusting menu softkey display dynamically. As shown in FIG. 4, it includes a control module for adjusting menu bar softkey display dynamically, wherein, the control module comprises a parameter obtaining unit, a display configuration unit and a display unit, wherein, the parameter obtaining unit is configured to obtain a total display length of the menu bar and respective corresponding character string length value and location information of all the softkeys on the menu bar;

the display configuration unit is configured to assign display location and display length for each non-zero softkey according to the number of the non-zero softkeys whose character string length values are not zero on the menu bar and location information of the non-zero softkeys;

the display unit is configured to display the non-zero softkey according to the assigned display location and display length, wherein:

a sum of the display length of each non-zero softkey is less than or equal to the total display length of the menu bar; if the character string length value corresponding to the non-zero softkey exceeds the assigned display length, intercept or abbreviation is performed.

The display configuration unit is further configured to, if the character string length value corresponding to any one non-zero softkey is greater than the length mean value received after the total display length of the menu bar is averaged according to the number of the non-zero softkeys and the number of the non-zero softkeys is 1, assign the display location according to the location information of that non-zero softkey and assign a length value of which the display length is less than $3/4$ of the total display length of the menu bar.

The display configuration unit is further configured to, if the character string length value corresponding to any one non-zero softkey is greater than the length mean value received after the total display length of the menu bar is averaged according to the number of the non-zero softkeys and the number of the non-zero softkeys is 2, assign the display location according to the location information of each non-zero softkey and assign a length value of which the display length is less than $2/5$ of the total display length of the menu bar.

The display configuration unit is further configured to, if the character string length value corresponding to any one non-zero softkey is greater than the length mean value received after the total display length of the menu bar is averaged according to the number of the non-zero softkeys and the number of the non-zero softkeys is 3, obtain a sum (disSum) of the character string lengths of three non-zero softkeys, if the difference of the total display length of the menu bar (disManu) and the disSum is less than or equal to a first threshold value, the first, second and third softkeys according to the assigned display location and the display coordinate.

The location information includes: left location, middle location and right location.

The location information also can be the location information indicating each softkey location number, for example, when four or more softkeys are set in the menu bar, it can represent the location information of each softkey by adopting the location number sequentially worked out according to the softkey arrangement from one end of the menu bar to another end, such as the first location, the second position, the third location, the fourth position, etc. When the dynamic assignment is performed on the menu bar with more than three softkeys, it can be performed referring to the idea of the above-mentioned implementation mode about the 3 softkeys.

Through applying the technical scheme of the dynamic display of the present invention, the display location and length of several softkeys of the bottom bar can be dynamically assigned, and is made to meet the requirement of the softkey of the bottom bar to the display content of the character string under various situations. Especially it is suitable for the dynamic display of the left, middle and right softkeys on the bottom bar in the user interface of the mobile communication terminals, such as the mobile phone, etc., which overcomes the defect that currently the fixed value is adopted to display the softkey of the bottom bar.

The above description is only the embodiments of the present invention and is not intended to limit the present invention. For those skilled in the art, the present invention can have various modifications and variations. All modifications, equivalents and/or variations without departing from the spirit and essence of the present invention should be embodied in the scope of the appending claims of the present invention.

INDUSTRIAL APPLICABILITY

Compared with the related art, the mobile terminal and the method for adjusting menu softkey display dynamically can dynamically assign the display location and length of the softkeys of the bottom bar, and it is made to be able to meet the requirement of the softkey on the menu bar to the display content of the character string under various situations, such as the bottom bar, etc. Especially it is suitable for the dynamic display of the left, middle and right softkeys on the bottom bar in the user interface of the mobile communication terminals, such as the mobile phone, etc., which overcomes the defect that currently the fixed value is adopted to display the softkey of the bottom bar.

What is claimed is:

1. A method for adjusting menu softkey display dynamically in a mobile terminal, the method comprising:
obtaining, with a display configuration unit of the mobile terminal, a total display length of a menu bar in a direction and respective corresponding character string length value in the direction and location information of all softkeys on the menu bar; and
assigning, with the display configuration unit of the mobile terminal, display location and display length of each non-zero softkey in the direction according to the number of the non-zero softkeys whose character string length values are not zero on the menu bar and the location information of the non-zero softkeys, and displaying each non-zero softkey according to the assigned display location and display length wherein:
a sum of the display length of each non-zero softkey is less than or equal to the total display length of the menu bar;
if the character string length value corresponding to one non-zero softkey exceeds the display length assigned for that non-zero softkey, intercepting or abbreviating the character string corresponding to the non-zero softkey;
wherein, the step of displaying the each non-zero softkey according to the assigned display location and display length comprises:
if the character string length value in the direction corresponding to any one non-zero softkey is greater than a length mean value received after the total display length of the menu bar in the direction is averaged according to the number of the non-zero softkeys and the number of the non-zero softkeys is 1, then:
assigning, with the display configuration unit of the mobile terminal, the display location according to the location information of that non-zero softkey, assigning character string length value in the direction of that non-zero softkey as less than or equal to ¾ of the total display length of the menu bar in the direction, and displaying that non-zero softkey; and
if the character string length value corresponding to any one non-zero softkey is greater than a length mean value received after the total display length of the menu bar is averaged according to the number of the non-zero softkeys and the number of the non-zero softkeys is 2, then:
assigning, with the display configuration unit of the mobile terminal, the display location according to the location information of each non-zero softkey, assigning a length value of which the display length is less than or equal to ⅖ of the total display length of the menu bar for each non-zero softkey, and displaying each non-zero softkey.

2. The method according to claim 1, wherein, the step of displaying each non-zero softkey according to the assigned display location and display length comprises:
if the character string length values corresponding to all the non-zero softkeys are less than or equal to a length mean value received after the total display length of the menu bar is averaged according to the number of the non-zero softkeys, then assigning, with the display configuration unit of the mobile terminal, the display location according to the location information of each non-zero softkey, regarding the length mean value as the display length, and displaying each non-zero softkey.

3. The method according to claim 2, wherein, the menu bar locates at a bottom bar, or a top bar, or a left side bar, or a right side bar on a user interface of a mobile terminal.

4. The method according to claim 2, wherein, the location information comprises: a left location, a middle location and a right location.

5. The method according to claim 1, wherein, the step of displaying each non-zero softkey according to the assigned display location and display length comprises:
if the character string length value corresponding to any one non-zero softkey is greater than a length mean value received after the total display length of the menu bar is averaged according to the number of the non-zero softkeys and the number of the non-zero softkeys is 3, then:
obtaining, with the display configuration unit of the mobile terminal, a sum disSum of the character string lengths of three non-zero softkeys, if the difference of the total display length of the menu bar disManu and the disSum is less than or equal to a first threshold value, then obtaining a mean value of surplus display space disAve=(disSum−disManu)/2; and
assigning the softkey display location according to the location information of the three non-zero softkeys, setting an initial coordinate of a first softkey as 0, the initial coordinate of a second softkey being the sum of the length value of the first softkey and the mean value disAve, the initial coordinate of a third softkey being the difference of the total display length of the menu bar disManu and the length value of the third softkey, and displaying the first, second and third softkeys according to the assigned display location and the display coordinate dynamically.

6. The method according to claim 5, wherein, the menu bar locates at a bottom bar, or a top bar, or a left side bar, or a right side bar on a user interface of a mobile terminal.

7. The method according to claim 5, wherein, the location information comprises: a left location, a middle location and a right location.

8. The method according to claim 1, wherein, the step of displaying each non-zero softkey according to the assigned display location and display length comprises:
if the character string length value corresponding to any one non-zero softkey is greater than a length mean value received after the total display length of the menu bar is averaged according to the number of the non-zero softkeys and the number of the non-zero softkeys is 3, then:
obtaining, with the display configuration unit of the mobile terminal, a sum disSum of the character string lengths of three non-zero softkeys, if the difference of the total display length of the menu bar disManu and the disSum is greater than a first threshold value, then obtaining a length difference of the character string of the first and third softkeys of which the location information locates at two ends respectively; if the length difference is greater than a set second threshold value, then:
setting an initial coordinate of the first softkey as 0, setting the initial coordinate of the third softkey as a difference of the total display length of the menu bar disManu minus the character string length of the first softkey and the second threshold value, and the second softkey being displayed in the middle in a surplus display space.

9. The method according to claim 8, wherein, the menu bar locates at a bottom bar, or a top bar, or a left side bar, or a right side bar on a user interface of a mobile terminal.

10. The method according to claim 8, wherein, the location information comprises: a left location, a middle location and a right location.

11. The method according to claim 1, wherein, the step of displaying each non-zero softkey according to the assigned display location and display length comprises:
if the character string length value corresponding to any one non-zero softkey is greater than a length mean value received after the total display length of the menu bar is averaged according to the number of the non-zero softkeys and the number of the non-zero softkeys is 3, then:
obtaining, with the display configuration unit of the mobile terminal, a sum disSum of the character string lengths of three non-zero softkeys, if a difference of the total display length of the menu bar disManu and the disSum is greater than a first threshold value, then obtaining a length difference of the character string of the first and third softkeys of which the location information locates at two ends respectively; if the length difference is less than or equal to a set second threshold value, then:
setting the length values of the first, second and third softkeys to be less than or equal to ⅓ length of the total display length of the menu bar disManu respectively, assigning the display location according to the location information of the first, second and third softkeys, and performing intercept or abbreviation on the character string which goes beyond ⅓ length of the total display length of the menu bar disManu.

12. The method according to claim 11, wherein, the menu bar locates at a bottom bar, or a top bar, or a left side bar, or a right side bar on a user interface of a mobile terminal.

13. The method according to claim 11, wherein, the location information comprises: a left location, a middle location and a right location.

14. The method according to claim 1, wherein, the menu bar locates at a bottom bar, or a top bar, or a left side bar, or a right side bar on a user interface of a mobile terminal.

15. The method according to claim 1, wherein, the location information comprises: a left location, a middle location and a right location.

16. A mobile terminal, comprising:
a control module for adjusting menu bar softkey display dynamically, wherein, the control module comprises a parameter obtaining unit, a display configuration unit and a display unit, wherein,
the parameter obtaining unit is configured to obtain a total display length of a menu bar in a direction and respective corresponding character string length value in the direction and location information of all softkeys on the menu bar;
the display configuration unit is configured to assign display location and display length for each non-zero softkey in the direction according to the number of the non-zero softkeys whose character string length values are not zero on the menu bar and location information of the non-zero softkeys;
the display unit is configured to display each non-zero softkey according to the assigned display location and display length, wherein:
a sum of the display length of each non-zero softkey is less than or equal to the total display length of the menu bar;
if the character string length value corresponding to a single non-zero softkey exceeds the display length assigned for that non-zero softkey, intercept or abbreviation is performed on the character string corresponding to the single non-zero softkey; and
the display configuration unit is further configured to, (1) of the character string length value in the direction corresponding to any one non-zero softkey is greater than the length mean value received after the total display length of the menu bar in the direction is averaged according to the number of the non-zero softkeys and the number of the non-zero softkeys is 1, assign the display location according to the location information of that non-zero softkey and assign character string length value in the direction of the non-zero softkey as less than ¾ of the total display length of the menu bar in the direction; and (2) if the character string length value corresponding to any one non-zero softkey is greater than a length mean value received after the total display length of the menu bar is averaged according to the number of the non-zero softkeys and the number of the non-zero softkeys is 2, assign the display location according to the location information of each non-zero softkey and assign character string length value in the direction of the non-zero softkey as less than or equal to ⅖ of the total display length of the menu bar for each non-zero softkey.

17. The mobile terminal according to claim 16, wherein, the menu bar locates at a bottom bar, or a top bar, or a left side bar, or a right side bar on a user interface of a mobile terminal.

18. The mobile terminal according to claim 17, wherein, the location information comprises: a left location, a middle location and a right location.

19. The mobile terminal according to claim 16, wherein, the location information comprises: a left location, a middle location and a right location.

20. The mobile terminal according to claim 16, wherein the display configuration unit is further configured to, if the character string length value corresponding to any one non-zero softkey is greater than a length mean value received after the total display length of the menu bar is averaged according to the number of the non-zero softkeys and the number of the non-zero softkeys is 3, obtain a sum disSum of the character string lengths of three non-zero softkeys if the difference of the total display length of the menu bar disManu and the disSum is less than or equal to a first threshold value, obtain a mean value of surplus display space disAve=(disSum−disManu)/2, assign the softkey display location according to the location information of the three non-zero softkeys, set an initial coordinate of a first softkey as 0, and display the first, second and third softkeys according to the assigned display location and the display coordinate dynamically, wherein the initial coordinate of a second softkey is the sum of the length value of the first softkey and the mean value disAve, and wherein the initial coordinate of a third softkey is the difference of the total display length of the menu bar disManu and the length value of the third softkey.

21. The mobile terminal according to claim 16, wherein the display configuration unit is further configured to, if the character string length value corresponding to any one non-zero softkey is greater than a length mean value received after the total display length of the menu bar is averaged according to the number of the non-zero softkeys and the number of the non-zero softkeys is 3, obtain a sum disSum of the character string lengths of three non-zero softkeys if the difference of the total display length of the menu bar disManu and the disSum is greater than a first threshold value, obtain a length difference of the character string of the first and third softkeys of which the location information locates at two ends, respectively, if the length difference is greater than a set second threshold value, set an initial coordinate of the first softkey as 0, set the initial coordinate of the third softkey as a difference of the total display length of the menu bar disManu minus the character string length of the first softkey and the second threshold value, and display the second softkey in the middle in a surplus display space.

22. The mobile terminal according to claim 16, wherein the display configuration unit is further configured to, if the character string length value corresponding to any one non-zero softkey is greater than a length mean value received after the total display length of the menu bar is averaged according to the number of the non-zero softkeys and the number of the non-zero softkeys is 3, obtain a sum disSum of the character string lengths of three non-zero softkeys if a difference of the total display length of the menu bar disManu and the disSum is greater than a first threshold value, obtain a length difference of the character string of the first and third softkeys of which the location information locates at two ends, respectively, if the length difference is less than or equal to a set second threshold value, set the length values of the first, second and third softkeys to be less than or equal to ⅓ length of the total display length of the menu bar disManu respectively, assign the display location according to the location information of the first, second and third softkeys, and perform intercept or abbreviation on the character string which goes beyond ⅓ length of the total display length of the menu bar disManu.

* * * * *

UNITED STATES PATENT AND TRADEMARK OFFICE
CERTIFICATE OF CORRECTION

| | | |
|---|---|---|
| PATENT NO. | : 8,659,625 B2 | Page 1 of 1 |
| APPLICATION NO. | : 13/258569 | |
| DATED | : February 25, 2014 | |
| INVENTOR(S) | : Xue Zhang | |

It is certified that error appears in the above-identified patent and that said Letters Patent is hereby corrected as shown below:

In the Specification:

In Column 8, Line 28, after "first threshold value," please insert --display--.

In Column 8, Line 30, after "coordinate" please insert --dynamically--.

In the Claims:

In Column 12, Line 4, before "the character string length value" please delete "of" and insert --if--.

Signed and Sealed this
Twenty-seventh Day of May, 2014

Michelle K. Lee
*Deputy Director of the United States Patent and Trademark Office*